United States Patent
Dumas et al.

(10) Patent No.: US 11,936,241 B2
(45) Date of Patent: Mar. 19, 2024

(54) STATOR ASSEMBLY FOR ELECTRIC MACHINE

(71) Applicants: Renault s.a.s., Boulogne-Billancourt (FR); NISSAN MOTOR CO., LTD., Yokohama (JP)

(72) Inventors: Eric Dumas, Houilles (FR); Francois Paris, Amfreville la mivoie (FR); Thomas Kalos, Milly la Foret (FR); Emmanuel Motte, Saint Jean du cardonnay (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 689 days.

(21) Appl. No.: 17/048,460

(22) PCT Filed: Apr. 11, 2019

(86) PCT No.: PCT/EP2019/059247
§ 371 (c)(1),
(2) Date: Feb. 16, 2021

(87) PCT Pub. No.: WO2019/201736
PCT Pub. Date: Oct. 24, 2019

(65) Prior Publication Data
US 2021/0167642 A1    Jun. 3, 2021

(30) Foreign Application Priority Data

Apr. 20, 2018 (FR) .................................... 18 53521

(51) Int. Cl.
*H02K 5/24* (2006.01)
*B60K 1/00* (2006.01)
*H02K 1/18* (2006.01)

(52) U.S. Cl.
CPC ............... *H02K 1/185* (2013.01); *B60K 1/00* (2013.01); *H02K 5/24* (2013.01)

(58) Field of Classification Search
CPC   H02K 1/185; H02K 5/24; H02K 5/04; H02K 5/02; H02K 5/00; B60K 1/00
(Continued)

(56) References Cited

U.S. PATENT DOCUMENTS 3,135,211 A * 6/1964 Pezzillo .............. F04D 13/0613
                                                   417/357
2009/0021104 A1   1/2009 Hattori
(Continued)

FOREIGN PATENT DOCUMENTS

DE   10 2009 000 010 A1   7/2010
EP        1 988 621 A1    11/2008
(Continued)

OTHER PUBLICATIONS

International Search Report dated Jul. 11, 2019 in PCT/EP2019/059247 filed Apr. 11, 2019, 2 pages.

*Primary Examiner* — Terrance L Kenerly
(74) *Attorney, Agent, or Firm* — Oblon, McClelland, Maier & Neustadt, L.L.P.

(57) ABSTRACT

A stator assembly for an electric machine includes a first housing portion, a second housing portion, a stator body inserted into at least the first housing portion, a link for rotatably linking the stator body with the first housing portion, a first attachment for attaching the stator body to the first housing portion, and a second attachment for attaching the two housing portions to one another. The assembly includes an annular seal inserted axially between the stator body and the first attachment as well as between the two housing portions.

9 Claims, 4 Drawing Sheets

(58) Field of Classification Search
USPC .............................................. 310/51, 88, 89
See application file for complete search history.

(56) References Cited

U.S. PATENT DOCUMENTS

2012/0007456 A1  1/2012  Hein et al.
2014/0197705 A1  7/2014  Sato et al.

FOREIGN PATENT DOCUMENTS

| JP | 64-9435 U | | 1/1989 | |
| JP | 2007-306751 A | | 11/2007 | |
| JP | 4111053 | * | 7/2008 | ............... H02K 5/04 |

* cited by examiner

STATOR ASSEMBLY FOR ELECTRIC MACHINE

BACKGROUND

The present invention concerns the domain of stator assemblies designed to be fitted to an electric machine, and more specifically stator assemblies designed to be fitted to an electric traction machine of an electric-drive or hybrid-electric-drive motor vehicle.

Electric machines, typically designed to be fitted to a power unit of an electric-drive or hybrid-electric-drive motor vehicle, include a stator built into a housing.

Building the stator into the housing in this manner causes the stator to be cantilevered within the housing, which results in the appearance of very-high-energy, low-frequency modes of vibration. In the case of an electric traction machine of a motor vehicle, a mode of torsion of the stator of approximately 650 Hz typically appears about the axis of the electric machine. The torque delivered by the electric machine contains a certain number of harmonics that significantly excite these modes and cause significant vibrations. This has a negative effect on the acoustic and vibratory reliability of the stator assembly, i.e. the mechanical resistance of the assembly is jeopardized when operating in these modes of vibration and the vibrations caused generate an acoustic noise that is uncomfortable for the occupants of the vehicle. An embedding link between the housing and the stator with lower torsional flexibility is therefore required.

Document JPS649435 discloses a cantilevered stator fastened in a stator housing using threaded stems. A centering ring seal facilitates assembly of the stator and limits the vibrations inherent in faulty centering and screwing dispersion of the threaded stems, but cannot limit the vibrations caused by modes of torsion of the stator itself.

BRIEF SUMMARY

In view of the foregoing, the invention is intended to propose a stator assembly that overcomes the aforementioned drawbacks.

More specifically, the invention is intended to increase the stiffness of the embedding link between the stator and the housing in order to improve the acoustic and vibratory reliability of the stator assembly.

For this purpose, a stator assembly is proposed for an electric machine comprising a first housing portion, a second housing portion, a stator body inserted into at least the first housing portion, linking means for rotatably linking the stator body to the first housing portion, first fastening means for fastening the stator body to the first housing portion, and second fastening means for fastening the housing portions to one another.

According to one of the general features thereof, this assembly comprises a ring seal inserted axially between the stator body and the first fastening means as well as between said two housing portions.

Including such a ring seal makes it possible to use a single part to create a seal between the inside and the outside of the housing and to increase the stiffness of the embedding link between the stator and the housing. Being a stiffness increase, the ring seal thus arranged works flat and provides very high stiffness in the plane thereof. This enhances the acoustic and vibratory reliability of the stator assembly.

According to a specific embodiment, the ring seal comprises an inner radial portion that is interposed axially between the stator body and the first fastening means, and an outer radial portion that is interposed axially between the housing portions.

The ring seal thus arranged is rigidly held by the housing. This enables the ring seal to further increase the stiffness of the embedding link between the stator and the housing.

Advantageously, the inner radial portion admits a plane of symmetry perpendicular to the axial direction, the outer radial portion admitting a plane of symmetry perpendicular to the axial direction, the axial offset between the plane of symmetry of the inner radial portion and the plane of symmetry of the outer radial portion being less than 3 mm.

Such a limitation of the axial offset enables the bearing plane of the ring seal on the stator to be brought closer to the bearing plane of the ring seal on the housing portions. This maximizes participation of the ring seal in increasing the stiffness of the embedding link.

Advantageously, the axial thickness of the inner radial portion and/or the outer radial portion is between 0.25 mm and 0.8 mm.

In one embodiment, the first housing portion has a cylindrical cavity, the stator body being inserted into the cylindrical cavity, the linking means having an axial rectilinear rib projecting radially outwards from the stator body and an axial rectilinear slot formed in the first housing portion and extending radially outwards from the cylindrical cavity, the rib being seated in the slot.

Advantageously, the assembly includes a first axial through-orifice formed in the ring seal, a second axial through-orifice formed in the rib and a third axial orifice formed in the first housing portion in axial alignment with the slot, the third orifice having a thread, the assembly comprising a threaded pin passing through the first orifice and the second orifice and cooperating with the thread of the third orifice.

The use of a threaded pin passing through the first orifice and the second orifice and cooperating with the thread of the third orifice enables the ring seal, stator and first housing portion to be fastened solidly.

A washer may also be associated with the pin, the pin having a head and the washer being interposed axially between the stator body and the head.

Such a washer increases torsional and compression strength when tightening the pin.

Preferably, the second fastening means comprise a first axial through-bore formed in the second housing portion, a second axial bore formed in the first housing portion and a screw, the second bore having a thread, the screw passing through the first bore and cooperating with the thread of the second bore.

The use of a screw passing through the first bore and cooperating with the thread of the second bore enables the housing portions to be fastened solidly.

In one embodiment, the ring seal is at least partially made of steel sheet, preferably steel sheet with a high elastic limit.

The seal made of steel sheet significantly enhances the stiffness of the embedding link between the stator and the housing, in particular with steel sheet with a high elastic limit.

The limited thickness of the seal helps to compensate for the geometric tolerances of the parts making up the stator assembly, limiting the stresses generated.

According to another aspect, an electric machine for a motor vehicle including a stator assembly as defined above is proposed.

BRIEF DESCRIPTION OF DRAWINGS

Other objectives, characteristics and advantages of the invention are set out in the description below, given purely by way of non-limiting example and with reference to the attached drawings, in which.

DETAILED DESCRIPTION

Figure 1:
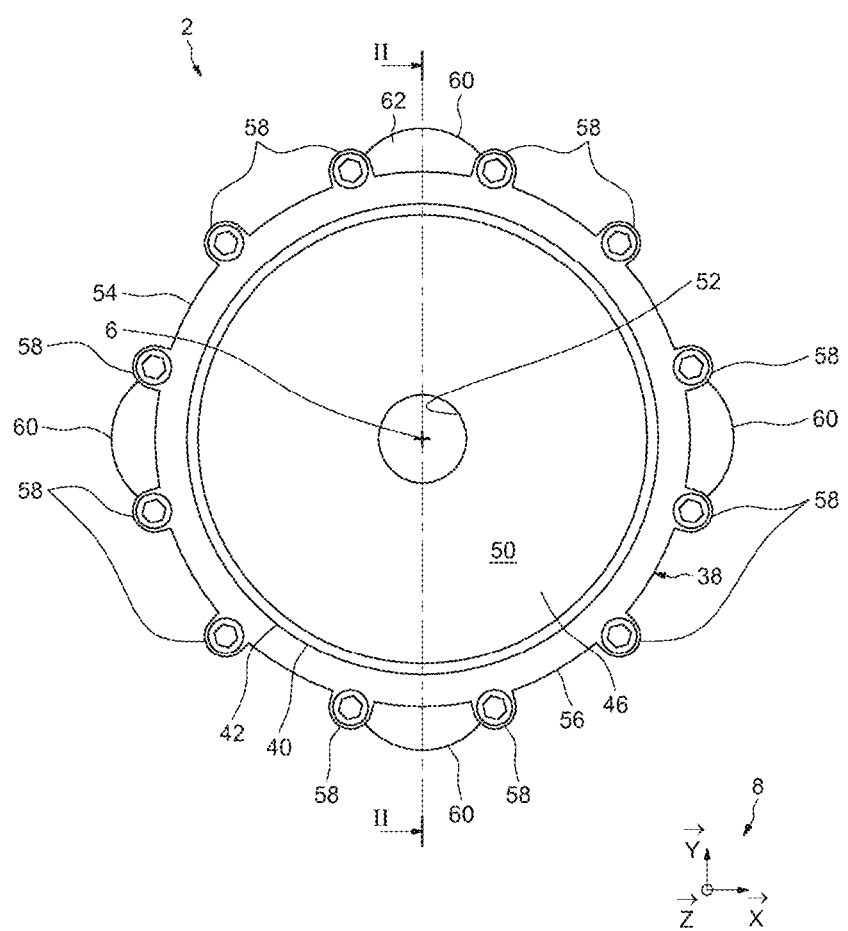
FIG. 1 is a radial view of a stator assembly according to a first embodiment of the invention.
Figure 2:
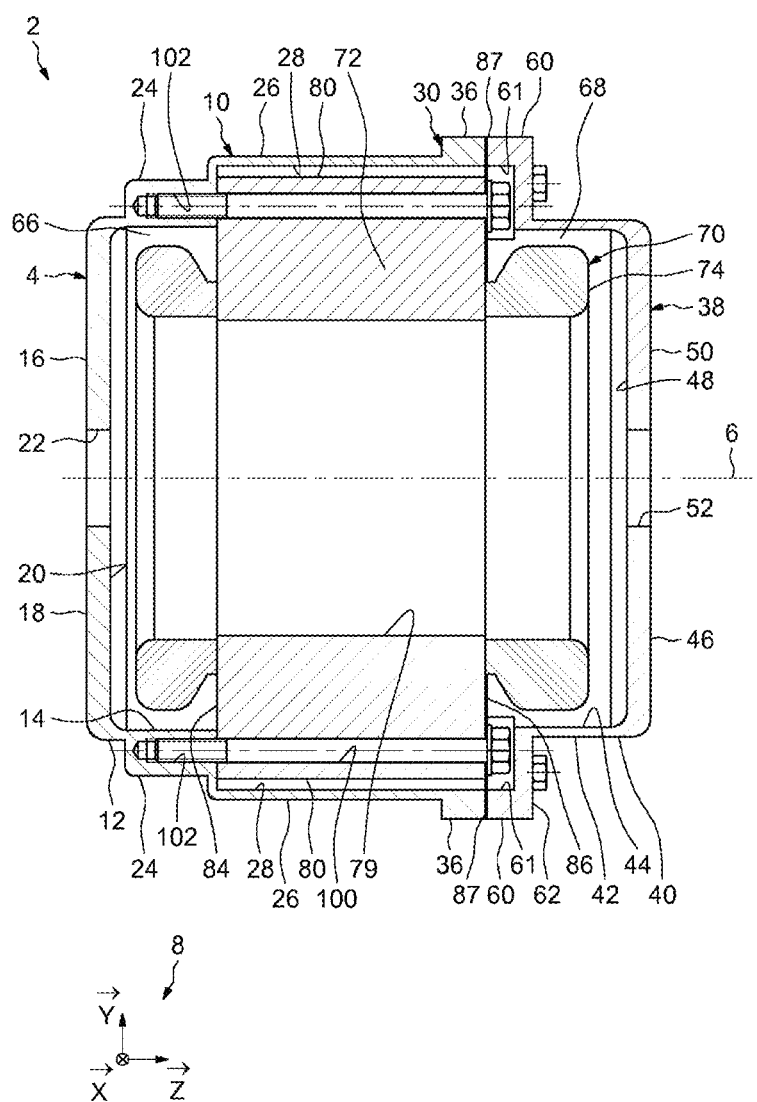
FIG. 2 is an axial cross-section view of the assembly in FIG. 1.
Figure 3:
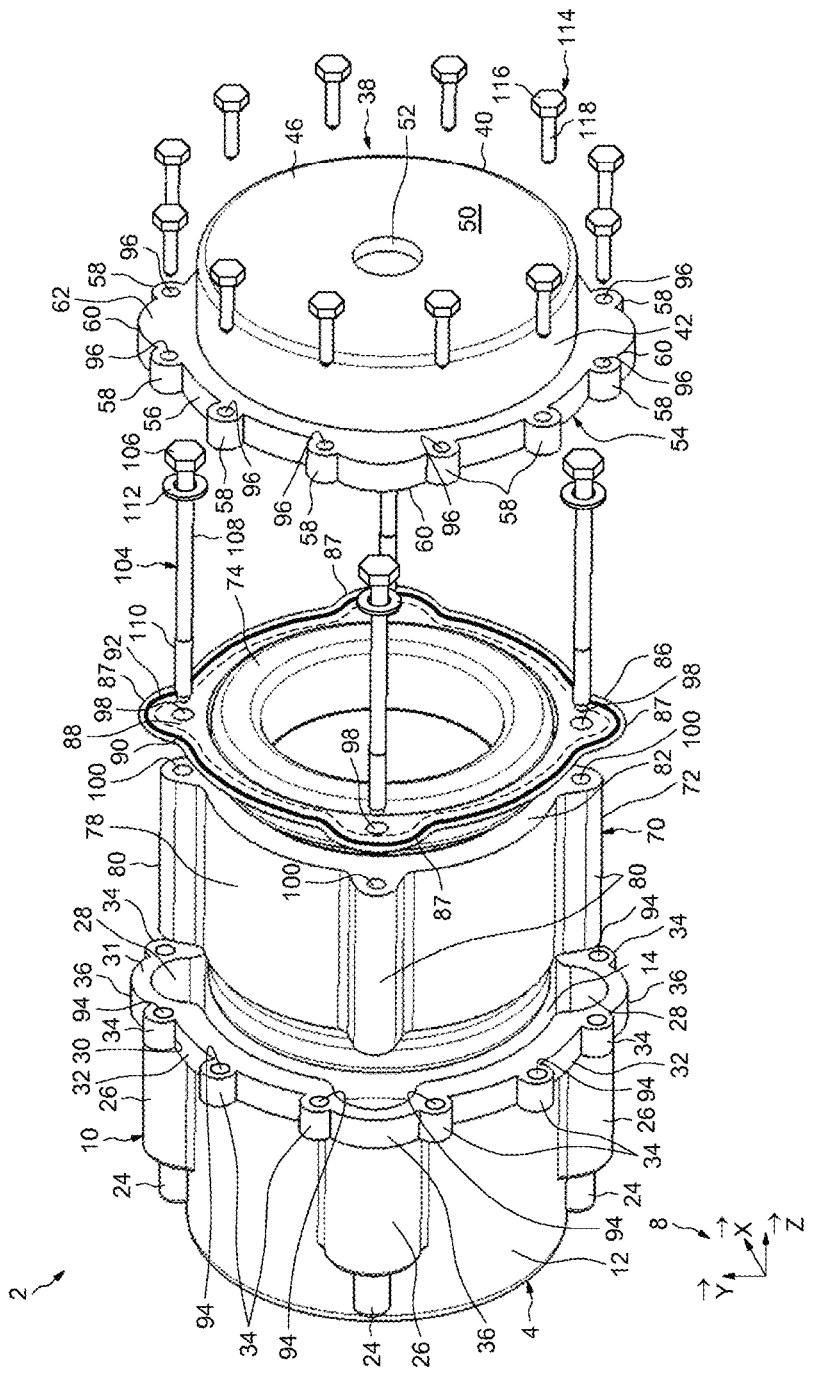
FIG. 3 is an exploded perspective view of the elements making up the assembly in FIGS. 1 and 2.

FIGS. 1 to 3 are schematic views of a stator assembly 2 designed to be fitted to an electric machine (not shown). In this case, the electric machine fitted with the assembly 2 is an electric traction machine of an electric-drive or hybrid-electric-drive motor vehicle.

The assembly 2 notably comprises a first housing portion 4, shown in FIGS. 2 and 3. The portion 4 is axisymmetric about an axis of symmetry 6. A direct orthonormal vector base 8 is attached to the portion 4. The base 8 comprises a vector $\vec{x}$, a vector $\vec{y}$ and a vector $\vec{z}$. The vector $\vec{z}$ is parallel to the axis 6.

In the present application, and unless otherwise specified, the terms "axial", "axially", "radial", "radially" and "tangential" shall be understood to relate to the axis 6. Furthermore, the term "cylindrical" shall be understood according to its conventional definition, i.e. a cylindrical surface is a surface comprising straight lines in a given direction meeting a given curve.

The first portion 4 comprises a main body 10. The body is cylindrical with a circular axial section about the axis 6. The body 10 extends radially between an outer cylindrical surface 12 and an inner cylindrical surface 14. The surfaces 12 and 14 are cylindrical with a circular axial section about the axis 6 and diameters $d_{12}$ and $d_{14}$ respectively.

The portion 4 has a back wall 16. The wall 16 extends axially between an outer axial surface 18 and an inner axial surface 20. The surfaces 18 and 20 are flat and perpendicular to the vector $\vec{z}$. The surfaces 18, 20 extend the surfaces 12, 14 respectively. The wall 16 has a through-opening 22. The opening 22 is cylindrical with a circular axial section about the axis 6 and of diameter $d_{22}$. The opening 22 is designed to receive a rotor shaft (not shown).

The portion 4 has four radial projections 24 spaced apart regularly about the circumference of the surface 12. The projections 24 are cylindrical relative to the direction of the vector $\vec{z}$. The projections 24 are substantially identical to one another.

The portion 4 has four radial projections 26 spaced apart regularly about the circumference of the surface 12. The projections 26 are axially aligned with the projections 24. The projections 24 are positioned axially between the wall 16 and the projections 26. The projections 26 are cylindrical relative to the direction of the vector $\vec{z}$. The thickness of the projections 26 in the radial direction is strictly greater than the thickness of the projections 24 in the radial direction. The projections 26 are substantially identical to one another.

The portion 4 has four axial rectilinear slots 28. The slots 28 are cylindrical relative to the direction of the vector $\vec{z}$. The slots 28 are spaced apart regularly about the circumference of the surface 14. The slots 28 extend radially outwards from the surface 14 to form internal grooves in the surface 14. The slots 28 are radially and inwardly aligned with the projections 24 and 26 respectively.

The portion 4 has a collar 30 shown in FIG. 3. The collar 30 extends radially outwards from the surface 12. The collar 30 is cylindrical about the direction of the vector $\vec{z}$. The projections 26 are positioned axially between the projections 24 and the collar 30. The collar 30 is delimited axially by an outer axial surface 31 opposite the projections 26. As such, the portion 4 extends axially between the surfaces 18 and 31.

Overall, the collar 30 is radially delimited by an outer cylindrical surface 32. The surface 32 is cylindrical with a circular axial section about the axis 6 and of diameter $d_{32}$. Locally, the collar 30 has twelve radial flanges 34. The flanges 34 are cylindrical about the direction of the vector $\vec{z}$. The flanges 34 are spaced apart regularly about the circumference of the surface 32. Also locally, the collar 30 has four radial flanges 36. The flanges 36 are thicker than the flanges 34. The flanges 36 are spaced apart regularly about the circumference of the cylindrical surface 32. More specifically, the flanges 36 are axially aligned with the projections 24 and 26. Thus, each flange 36 extends in the tangential direction between two adjacent flanges 34.

With reference to FIGS. 1 to 3, the assembly 2 has a second housing portion 38. The portion 38 is axisymmetric about the axis 6. When assembled, the portions 4 and 38 form a housing for the electric machine.

The portion 38 comprises a main body 40 that is cylindrical about the axis 6. The body 40 extends radially between an outer cylindrical surface 42 and an inner cylindrical surface 44. The surfaces 42, 44 are respectively cylindrical with a circular axial section about the axis 6 and of diameters $d_{42}$ and $d_{44}$ respectively. The diameters $d_{42}$ and $d_{44}$ are respectively equal to the diameters $d_{12}$ and $d_{14}$:

$$\begin{cases} d_{12} = d_{42} \pm 1 \text{ mm} \\ d_{14} = d_{44} \pm 1 \text{ mm} \end{cases}$$

The portion 38 has a back wall 46 extending axially between an inner axial surface 48 and an outer axial surface 50. The surfaces 42, 44 are connected to the surfaces 50, 48 respectively.

The wall 46 has a cylindrical through-opening 52. The opening 52 is cylindrical with a circular axial section about the axis 6 and of diameter $d_{52}$, which is substantially equal to the diameter $d_{22}$. Like the opening 22, the opening 32 is designed to receive a rotor shaft (not shown).

The portion 38 has a collar 54. The collar 54 is cylindrical about the direction of the vector $\vec{z}$. Overall, the collar 54 is radially delimited by an outer cylindrical surface 56. The surface 56 is cylindrical with a circular axial section about the axis 6 and of diameter $d_{56}$. The diameter $d_{56}$ is substantially equal to the diameter $d_{32}$. Locally, the collar 54 has twelve relatively thin radial flanges 58 and four relatively thick radial flanges 60. The flanges 58, 60 are axially aligned with the flanges 36, 34 respectively. As such, the collar 54 is substantially identical to the collar 30.

The collar 54 extends axially between a proximal front surface 62 and a distal front surface 64 (not shown in the figures). The surfaces 62 and 64 are flat and perpendicular to the vector $\vec{z}$. As such, the portion 38 extends axially between the surfaces 50 and 64. Furthermore, the surfaces 64 and 31 form seam sidewalks designed to bear directly or indirectly against one another in order to form a sealed seat for a stator seated in the housing.

The portion 38 has four axial rectilinear slots 61, shown in FIG. 2. The slots 61 are axially aligned with the slots 34. The axial cross section of the slots 61 is substantially identical to the axial cross section of the slots 34. Thus, the slots 61 extend radially inwards from the surface 44 to form internal grooves in the surface 44.

As shown in FIG. 2, the portion 4 includes a cavity 66. The cavity 66 is cylindrical in relation to the direction of the vector $\vec{z}$. The cavity 66 extends axially between the surfaces 20 and 31. The cavity 66 is delimited radially and externally by the surface 14 and the surfaces delimiting the slots 28.

The portion 38 includes a cylindrical cavity 68. The cavity 68 extends axially between the surfaces 64 and 48. The cavity 68 is radially delimited by the surface 44 and the inner surface of the slots 61.

The assembly 2 includes a stator 70. The stator 70 notably comprises a stator body 72 and a stator winding 74.

The stator body 72 is cylindrical and axisymmetric about the axis 6. Overall, the stator body 72 extends radially between an outer cylindrical surface 78 and an inner cylindrical surface 79. The surfaces 78 and 79 are cylindrical with a circular axial section about the axis 6. The diameter $d_{78}$ of the circular axial section of the surface 78 is slightly less than the diameter $d_{14}$.

Locally, the stator body 72 has four ribs 80. The ribs 80 are rectilinear in the direction of the vector $\vec{z}$. The ribs 80 are spaced apart regularly about the circumference of the surface 78. The ribs 80 extend radially outwards from the surface 78. The ribs 80 extend along the entire axial length of the stator body 72. The thickness of the ribs 80 is slightly less than the depth of the slots 28.

The stator body 72 extends axially between a front surface 82 and a front surface 84. The surfaces 82 and 84 are flat and perpendicular to the vector $\vec{z}$.

The assembly 2 has a ring seal 86. The seal 86 is cylindrical and axisymmetric about the axis 6. The seal 86 is intended to seal the cavities 66 and 68 from the outside of the housing and to enhance the stiffness of the embedding link between the elements 4, 38 and 72.

The seal 86 is made of steel sheet with a high elastic limit. For example, the seal 86 can be made of the steels in the table below:

| European standard EN 10027 | Standard Afnor NF A 35573 | American standard AISI |
|---|---|---|
| X6Cr17 1.4016 | Z8C17 | 430 |
| X12CrMoS17 | Z10CF17 | 430 F |
| X5CrNi18-101.4301 | Z7CN18-09 | 304 |
| X5CrNiMo18-101.4401 | z6CND17-11 | 316 |

The seal 86 is substantially flat and perpendicular to the vector $\vec{z}$. The seal 86 is delimited radially by an inner cylindrical surface (not referenced) with a circular axial section about the axis 6 and of diameter $d_{86i}$. Overall, the seal 86 is delimited radially by an outer cylindrical surface (not referenced) with a circular axial section about the axis 6 and of diameter $d_{86e}$. The diameter $d_{86i}$ is strictly less than the diameter $d_{78}$. The diameter $d_{86e}$ is strictly greater than the diameter $d_{14}$ and preferably slightly less than the diameter $d_{12}$. More specifically, in the example illustrated:

$$d_{86i} = \frac{9}{10} \cdot d_{78} \pm 1\%$$

$$d_{86e} = \frac{d_{14} \cdot 9 \cdot d_{12}}{10} \pm 1\%$$

Locally, the seal 86 is extended radially by four lugs 87. The lugs 87 are spaced apart regularly about the circumference of the outer surface of the seal 86. The radial thickness of the lugs 87 is substantially equal to the radial thickness of the flanges 36.

The seal 86 is split into an inner radial portion 88 and an outer radial portion 90. The limit between the portions 88 and 90 corresponds to the axial projection of the stator body 72 on to the flat surface of the seal 86. In other words, the portion 88 has a portion positioned between the two cylinders of revolution about the axis 6 of diameter $d_{86i}$ and $d_{78}$. Furthermore, the portion 88 has the four portions of the seal 86, which are axially aligned with the four ribs 80 respectively. The portion 90 corresponds to the remainder of the seal 86.

The portions 88 and 90 admit respectively the planes of symmetry $P_{symmetry\_88}$ and $P_{symmetry\_90}$ (not shown). The planes $P_{symmetry\_68}$ and $P_{symmetry\_90}$ are perpendicular to the vector $\vec{z}$ and positioned in the middle of the axial thickness of the portions 88 and 90. In the first embodiment, the planes $P_{symmetry\_88}$ and $P_{symmetry\_90}$ are the same. The thickness of the seal 86 is between 0.25 mm and 0.8 mm.

The seal 86 has a rib 92 on one of the axial surfaces thereof. The rib 92 extends about the entire circumference of the axial surface of the seal 86. The rib 92 is formed on the outer radial portion 90. In a radial projection, the rib 92 is positioned at a distance $l_{92}$ from the outer radial limit of the seal 86, the distance $l_{92}$ being constant. In other words, the rib 92 as a whole forms a circle about the axis 6 of diameter $d_{92}$ greater than $d_{14}$. Locally, the rib 92 moves away from the axis 6 relative to this circle, the gap varying from zero to a maximum value slightly greater than the radial depth of the slot 28. As such, the rib 92 can be in full contact with the surface 64 or with the surface 31, as a function of the orientation of the seal 86.

With reference to FIG. 3, the portion 4 includes twelve axial bores 94. The bores 94 are blind. The bores 94 are cylindrical and have a circular section about an axis parallel to the vector $\vec{z}$ and are of diameter $d_{94}$. The bores 94 are threaded. The twelve bores 94 are formed respectively in the twelve flanges 34.

The portion 38 has twelve axial bores 96. The bores 96 are cylindrical and have a circular axial section about an axis parallel to the vector $\vec{z}$ and are of diameter $d_{96}$. The bores 96 are through-bores and are threaded identically to the bores 94. The twelve bores 96 are formed respectively in the twelve flanges 58. The diameters $d_{94}$ and $d_{96}$ are substantially equal.

$$|d_{94}=d_{96}\pm1\%$$

The seal 86 has four axial orifices 98. The orifices 98 are cylindrical and have a circular axial section about an axis parallel to the vector $\vec{z}$ and are of diameter $d_{98}$. The orifices 98 are radially and inwardly aligned with the lugs 87.

The stator body 72 has four axial orifices 100. The axial orifices 100 are cylindrical and have a circular axial section about an axis parallel to the vector $\vec{z}$ and are of diameter $d_{100}$. The four orifices 100 are respectively formed in the four ribs 80.

With reference to FIG. 2, the portion 4 includes four axial orifices 102. The orifices 102 are blind and threaded. The orifices 102 are cylindrical and have a circular axial section about an axis parallel to the vector $\vec{z}$ and are of diameter $d_{102}$. The four orifices 102 are respectively formed in the four projections 24. The diameters $d_{98}$, $d_{100}$ and $d_{102}$ are substantially equal.

With reference to FIG. 3, the assembly 2 has four threaded pins 104. Each pin 104 has a head 106, an unthreaded portion 108 and a threaded portion 110. The portion 108 is positioned axially between the head 106 and the portion 110. The portions 108 and 110 are cylindrical with a circular axial section of diameter $d_{104}$ that is slightly less than the diameter $d_{98}$. The thread of the portion 110 is designed to cooperate with the thread of the orifices 102.

Four washers 112 are respectively associated with the four pins 104. The internal diameter $d_{112i}$ of the washers 112 is slightly greater than the diameter $d_{104}$. The outer radius $r_{112e}$ of the washers 112 is strictly less than the minimum distance between the axis of an orifice 98 and the rib 92.

The washers 112 are preferably made of non-magnetic material. For example, one of the steels in the table below can be used to make the washers 112:

| European standard EN 10027 | Standard Afnor NF A 35573 | American standard AISI |
|---|---|---|
| X5CrNi18-101.4301 | Z7CN18-09 | 304 |

The assembly 2 has twelve screws 114. Each screw 114 comprises a head 116 and a threaded stem 118. The diameter $d_{118}$ and the thread of the stem 118 are designed to cooperate with the diameters $d_{96}$ and $d_{94}$ and the threads of the bores 96 and 94.

The assembly 2 can be assembled as follows:

Firstly, the stator 70 is inserted into the cavity 66. More specifically, the stator body 72 is fully seated in the cavity 66, while a portion of the winding 74 projects axially out of the cavity 66. The ribs 80 enter the slots 28.

The seal 86 is then arranged against the surface 82. In this layout, the portion 88 bears against the surface 82 and the portion 90 bears axially against the surface 31.

The pins 104 are then inserted into and pivoted in the orifices 98, 100 and 102. This causes the thread of the portion 110 to cooperate with the thread of the orifice 102. When the pins 104 are tightened, the elements 4, 70 and 86 form a rigid assembly.

In this embodiment, the seal 86 is arranged in the position shown in FIG. 3, i.e. with the rib 92 opposite the elements 4 and 70. The seal 86 can naturally be in a position in which the rib 92 is adjacent to the elements 4 and 70 without thereby moving outside the scope of the invention. In this case, the rib 92 is pressed axially against the surface 31.

The portion 38 is then in contact with the portion 4 such that the surfaces 31 and 64 face one another axially. More specifically, the portion 38 is oriented in relation to the portion 4 such that the flanges 60 are arranged to face the flanges 26. In this layout, the surface 64 is in direct contact with the rib 92.

The screws 114 are then tightened. This causes the thread of the stems 118 to cooperate with the thread of the bores 96 and 94. When the screws 114 are tightened, the elements 4, 70, 86 and 38 form a rigid assembly. The surface 64 axially compresses the rib 92 to create a seal between an internal space and an outer space of the housing. The seal 86 is compressed between the seam sidewalks 31 and 64 and bears axially against the stator body 72. Fastening the stator body 72 using the pins 104 and making the seal 86 from steel sheet with a high elastic limit and low thickness help to increase the stiffness of the embedding link between the stator body 72 and the housing.

Although in the example shown in FIGS. 1 to 3, the assembly 2 has four subassemblies each comprising a projection 24, a projection 26, a flange 36, a lug 87, a flange 60, an orifice 98, an orifice 100, an orifice 102, a washer 112 and a pin 104, it is naturally possible to select a different number of such subassemblies without thereby moving outside the scope of the invention. It is also possible to select another number of subassemblies each having a flange 34, a flange 58, a bore 94, a bore 96 and a screw 114 without thereby moving outside the scope of the invention. It is also possible to select another number of subassemblies each having a rib 80 and a slot 28 without thereby moving outside the scope of the invention.

Although in the example shown in FIGS. 1 to 3, only the orifice 102 is threaded, it is naturally possible for one of the orifices 98 and 100 to be threaded without thereby moving outside the scope of the invention. Equally, the bore 96 can be unthreaded.

Figure 4:
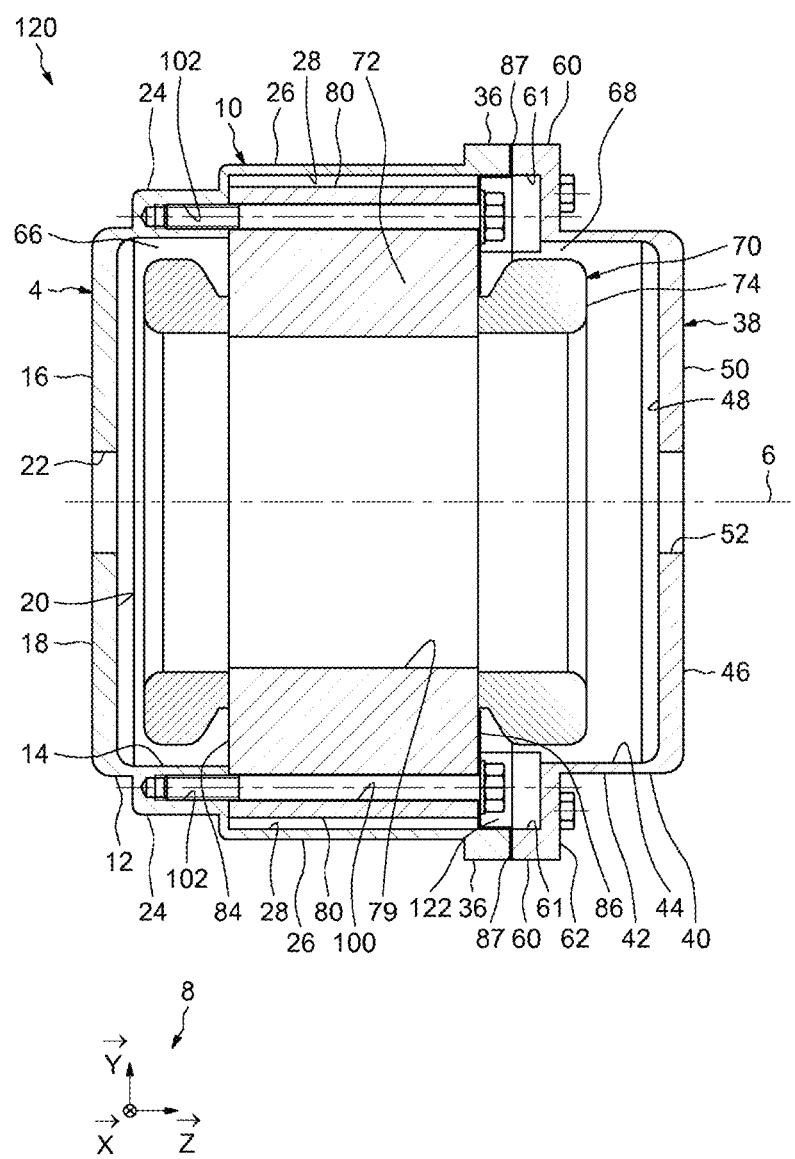
FIG. 4 is an axial cross-section view of an assembly according to a second embodiment of the invention.

FIG. 4 is a schematic representation of a stator assembly 120 according to a second embodiment of the invention. The same elements are indicated using the same reference signs.

The axial length of the stator body 72 of the assembly 120 is shorter than the axial length of the stator body 72 of the assembly 2. The inner radial portion 88 is axially offset in relation to the outer radio portion 90. The axial offset Δ between the planes $P_{symmetry\_88}$ and $P_{symmetry\_90}$ is substantially equal to the offset between the surfaces 31 and 82 when the stator body 72 is installed at the bottom of the cavity 66. The offset Δ is preferably strictly less than 3 mm.

In this embodiment, the seal 86 has a cylindrical portion 122 in addition to the portions 88 and 90. The portion 122 is cylindrical in relation to the direction of the vector $\vec{z}$. The axial section of the portion 122 corresponds to the axial projection of the stator body 72. The axial thickness of the portion 122 is substantially equal to the offset L.

In this embodiment, this arrangement makes it possible to create the seal between the inner space and the outer space of the housing and to increase the stiffness of the embedding link, even where the stator body 72 is axially shorter than the portion 4.

In the second embodiment, the seal 86 is designed to take account of a reduction in the axial length of the stator body 72. However, it is naturally possible to adapt the seal 86 to take into account an increase in the axial length of the stator body 72 without thereby moving outside the scope of the invention.

Creating a seal between the inside and the outside of the housing facilitates aspiration of hydraulic fluid. This makes oil surges of the suction point less sensitive to inclines on account of the lesser displacement of hydraulic fluid. Increasing the stiffness of the embedding link between the housing and the stator body effectively absorbs vibrations that could appear in this link, thereby enhancing the acoustic and vibratory reliability of the stator assembly according to the invention.

The invention claimed is:

1. A stator assembly for an electric machine comprising:
    a first housing portion;
    a second housing portion;
    a stator body inserted into at least the first housing portion;
    linking means for rotatably linking the stator body to the first housing portion;

first fastening means for fastening the stator body to the first housing portion;

second fastening means for fastening the housing portions to one another; and a ring seal interposed axially between the stator body and the first fastening means and the ring seal is positioned between, and in direct contact with the first housing portion and the second housing portion.

2. The assembly as claimed in claim 1, in which the ring seal comprises an inner radial portion that is interposed axially between the stator body and the first fastening means, and an outer radial portion that is interposed axially between the housing portions.

3. The assembly as claimed in claim 2, in which the axial thickness of the inner radial portion and/or the outer radial portion is between 0.25 mm and 0.8 mm.

4. The assembly as claimed in claim 1, in which the first housing portion has a cylindrical cavity, the stator body being inserted into the cylindrical cavity, the linking means having an axial rectilinear rib projecting radially outwards from the stator body and an axial rectilinear slot formed in the first housing portion and extending radially outwards from the cylindrical cavity, the rib being seated in the slot.

5. The assembly as claimed in claim 4, including a first axial through-orifice formed in the ring seal, a second axial through-orifice formed in the rib, and a third axial orifice formed in the first housing portion in axial alignment with the slot, the third orifice having a thread, the assembly comprising a threaded pin passing through the first orifice and the second orifice and cooperating with the thread of the third orifice.

6. The assembly as claimed in claim 5, comprising a washer associated with the pin, the pin having a head, the washer being interposed axially between the stator body and the head.

7. The assembly as claimed in claim 4, in which the second fastening means comprise a first axial through-bore formed in the second housing portion, a second axial bore formed in the first housing portion and a screw, the second bore having a thread, the screw passing through the first bore and cooperating with the thread of the second bore.

8. The assembly as claimed in claim 1, in which the ring seal is at least partially made of steel sheet.

9. An electric machine for a motor vehicle comprising: the assembly as claimed in claim 1.

* * * * *